United States Patent [19]

Harris

[11] Patent Number: 4,929,353
[45] Date of Patent: May 29, 1990

[54] PORTABLE LIQUID-SOLID SEPARATOR FOR BULK SLUDGE

[76] Inventor: Ronald B. Harris, 28191 Range Rd., Livingston, La. 70754

[21] Appl. No.: 306,700
[22] Filed: Feb. 6, 1989
[51] Int. Cl.⁵ ............................................. B01D 35/30
[52] U.S. Cl. .................................. 210/237; 210/241; 210/473
[58] Field of Search ................ 210/232, 237, 241, 247, 210/249, 293, 452, 473, 770, 497.01, 497.1

[56] References Cited

U.S. PATENT DOCUMENTS

| | | | |
|---|---|---|---|
| 2,461,814 | 2/1949 | Fisher | 210/241 |
| 2,649,965 | 8/1953 | King et al. | 210/241 |
| 3,631,987 | 1/1972 | Cattano | 210/452 |
| 4,046,689 | 9/1977 | Argyll | 210/241 |
| 4,200,535 | 4/1980 | Kennedy | 210/241 |
| 4,377,475 | 3/1983 | Wiedemann | 210/241 |
| 4,436,622 | 3/1984 | Petretti | 210/241 |
| 4,807,373 | 2/1989 | Sloan et al. | 210/237 |
| 4,854,058 | 8/1989 | Sloan et al. | 210/237 |
| 4,871,449 | 10/1989 | Lott | 210/241 |
| 4,871,454 | 10/1989 | Lott | 210/237 |

FOREIGN PATENT DOCUMENTS 56-76217  6/1981  Japan ................................. 210/237

Primary Examiner—Frank Spear
Assistant Examiner—Joseph Drodge
Attorney, Agent, or Firm—William D. Kiesel; Timothy J. Monahan; Robert C. Tucker

[57] ABSTRACT

A portable liquid-solid separator for handling sludge in bulk with an upright vessel having a bed with a drain and surrounding sides. A grate overlays the interior of the vessel, bed and sides. A filter overlays the grate, extending up the sides and overlapping the side grate. The separator is filled with a sludge which is then separated by gravity filtration and the wicking action of the filter. Liquid is drained out the bottom of the vessel and the solids are transported within the vessel. In a preferred embodiment, the vessel is a bath tub style trailer with dumping capabilities.

8 Claims, 2 Drawing Sheets

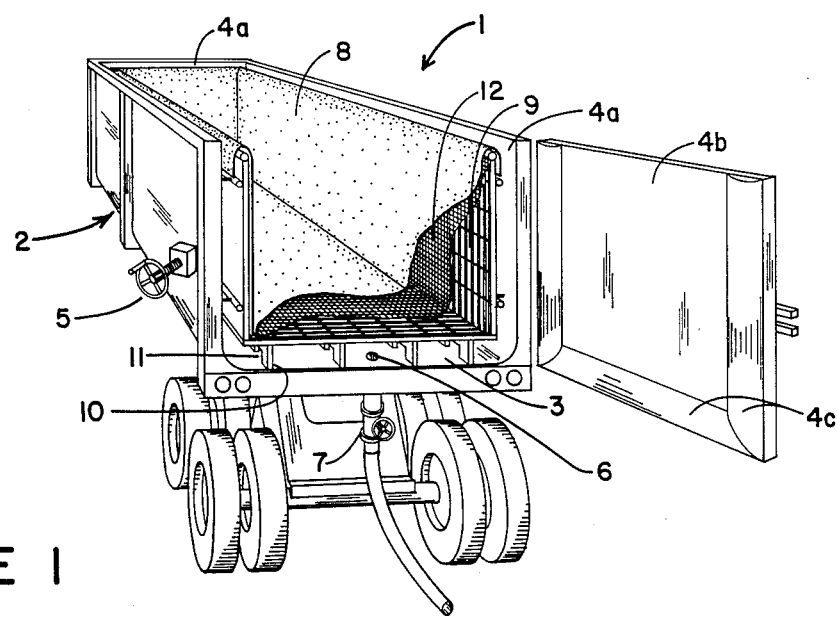
FIGURE 1
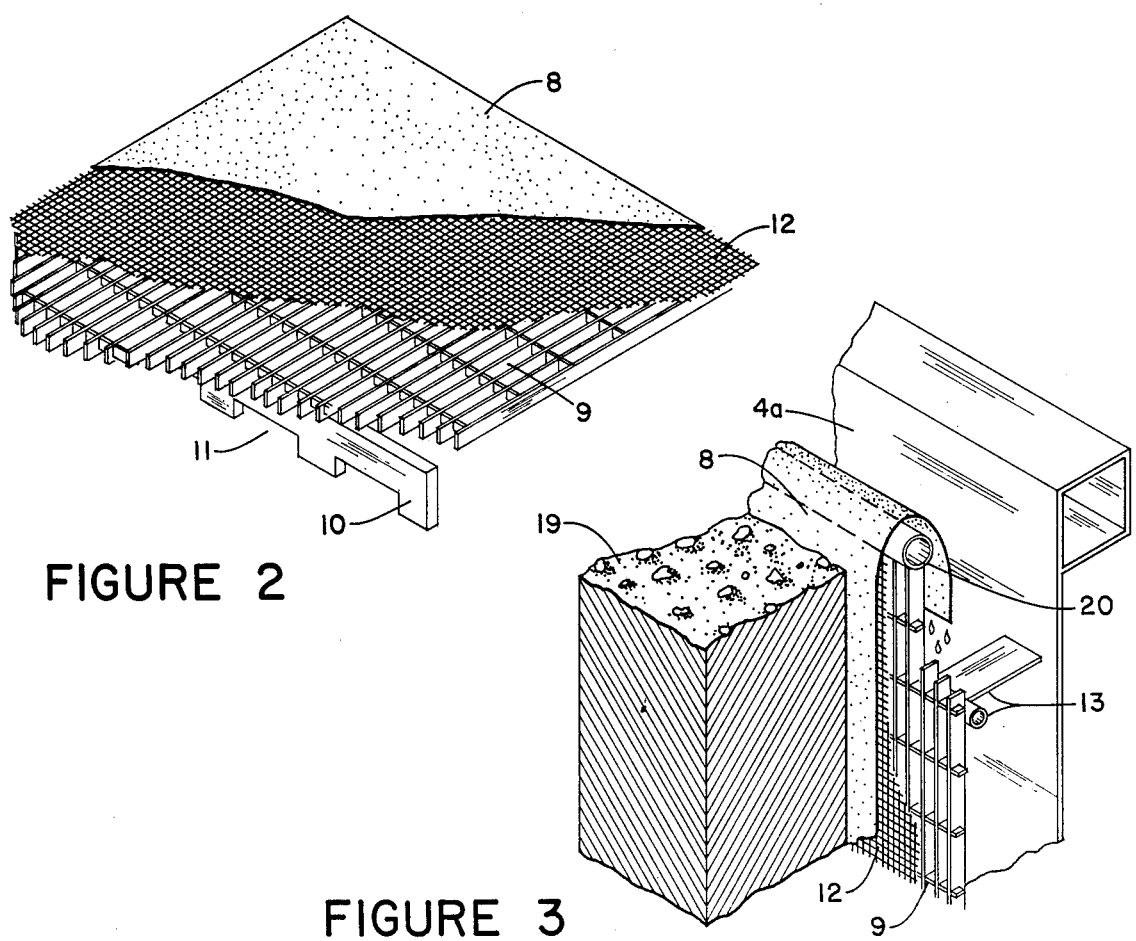
FIGURE 2
FIGURE 3

PORTABLE LIQUID-SOLID SEPARATOR FOR BULK SLUDGE

BACKGROUND OF THE INVENTION

1. Field of the Invention

This invention relates generally to liquid-solid separators and particularly to portable separators employing a combination of filtration and capillary action for treatment of sludge in bulk.

2. Prior Art

The present invention is useful whenever it is desirable to effect liquid-solid separation of a material which is to be transported. The invention may be applied to dewatering a sludge, removing hazardous liquid waste from contaminated solids or drying a moist product such as wood pulp.

Various approaches have been taken in the prior art to address the aforementioned problems. In U.S. Pat. Nos. 4,200,535 and 4,377,475, cyclone separators incorporated into a truck trailer are used to separate liquids from solids. The liquid from the cyclone separator is discharged and the solids are collected in the trailer.

A combination of overflow drains and burners is used to dry a sludge in U.S. Pat. No. 4,046,689. Essentially, the sludge is boiled, aerated and dried. This process is energy intensive and can exacerbate an existing odor problem. Any waste containing a flammable liquid would present a danger of an explosion.

Inclined drainboards are provided in U.S. Pat. No. 2,649,965. No provisions are made to collect the liquid waste after it drains away. Furthermore, while inclined drainboards may be practical with wet textiles, they would not prevent a particulate from being swept out with the liquid.

SUMMARY OF THE INVENTION

Therefore, one object of the present invention is to provide a vessel which will effect liquid-solid separation by filtration and by capillary action.

Another object of this invention is to provide a separator which can be transported without additional handling of the retained solids.

Another object of this invention is to provide a separator which allows for collection of the liquid phase.

Another object of this invention is to provide a separator which does not require energy input.

Another object of this invention is to provide a separator which can be used for hazardous waste.

Still another object of this invention is to provide a separator which can be used for sludge containing fines and particulate matter.

Other objects and advantages of this invention shall become apparent from the ensuing description.

Accordingly, a portable liquid-solid separator is provided comprising a vessel having a bed and surrounding sides, a grate overlaying the bed and the sides and a filter medium overlaying the grate. The filter medium overlaps the top of the grate and has an edge positioned between the grate and the side. Support bars are placed between the grate and bed to elevate the grate and facilitate washing out the vessels. The liquid is collected via a valved opening in the bed. In a preferred embodiment, the vessel is a trailer with a side being a gate for dumping the solids after separation has been achieved.

BRIEF DESCRIPTION OF THE DRAWINGS

FIG. 1 is a perspective of a liquid-solid separator incorporating a trailer.

FIG. 2 is an exploded view of the filter, grate and ancillary supports.

FIG. 3 is a detailed perspective of the filter lapped over a side grate.

PREFERRED EMBODIMENTS OF THE INVENTION

Figure 4:
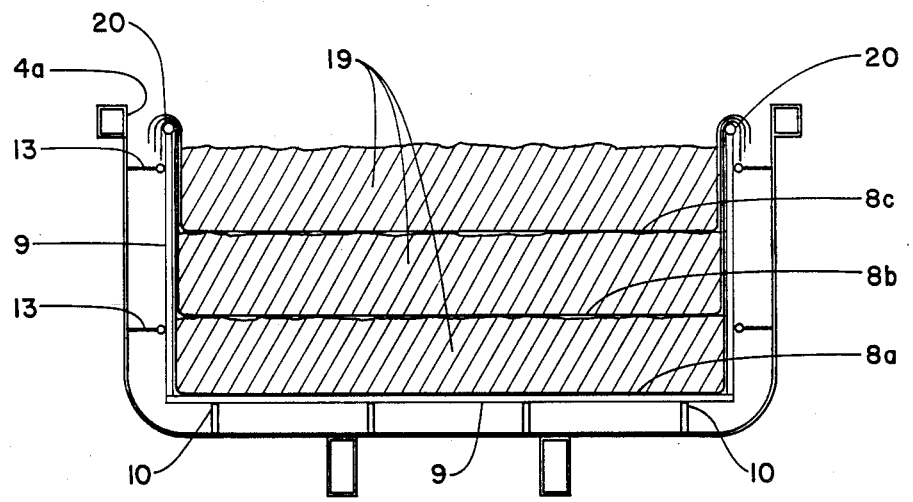
FIG. 4 is a cross section showing the use of multiple filters.

The preferred embodiment of the invention herein combines filtration and capillary action to deliquify a sludge. The term sludge is intended to include a liquid-solid mixture regardless of the particle size of the solid, composition of the liquid or value of the mixture. The invention is particularly suited for sludges comprising hazardous waste wherein handling of the waste is preferably minimized. Ideally, the sludge is deposited into a separator vessel where the liquid is drained out the bottom. Separation can take place on site or at a secondary site. Once the sludge is suitably dry, the remaining solids can be transported within the vessel to a solids disposal site, whether it be a landfill or waste processing plant.

Referring to FIG. 1, in a preferred embodiment of separator 1, vessel 2 is a trailer. An example of a trailer suitable for use in the invention is a 25–35 yard, bath tub trailer with dumping capabilities manufactured by Clement Industries, Minden, La. Vessel 2 has bed 3 and sides 4a and 4b surrounding bed 3. The stationary sides are designated 4a. To facilitate dumping vessel 2, the rear side of vessel 2 is a gate 4b which swings on a vertical axis. Gate 4b has a compressible seal 4c which can be urged against the rear of trailer 2 and grate 9 by latch 5 to create a water tight seal. Drain 6 is provided in bed 3 for removing the liquid which has separated from the sludge. Drain 6 has valve 7 to block flow of the liquid. For convenience drain 6 has a coupling compatible with standard industrial hoses.

Filtration of the sludge and capillary "wicking" of the liquid is accomplished by filter 8 which overlays bed 3 and partially covers sides 4. The material and mesh size of filter 8 is chosen in response to the type of sludge being handled. Important design considerations are the corrosiveness, solvent strength, particle size and separation criteria for a sludge. Another important consideration for filter 8 is that it be suitable to employ capillary action to wick up the liquid from the sludge. Examples of suitable filter media are: paper, cotton, nylon and other organic polymers, metal mesh and fiberglass. Those with skill in the art may choose from a variety of fibrous filters on the market to meet the aforementioned design criteria. It is believed that filters containing cotton will be suitable to wick aqueous liquids while filters containing organic polymers, such as polypropylene, will be able to wick organic liquids. Wicking action is particularly helpful with sludges containing fines which do not drain well and wherein the liquid tends to pool on top of the sludge.

Filter 8 is supported out from the interior of vessel 2 to both allow the liquid filtrate to drain away from filter 8 and to allow filter 8 to be lapped over a side support as shown in FIG. 3 thereby promoting wicking of the liquid. In a preferred embodiment, the foundation of the means for supporting filter 8 is grate 9. Referring to FIG. 2, grate 9 is a grate made of parallel metal bars with cross supports. Grates 9 should be capable of supporting loads of up to 60,000–80,000 pounds per trailer load. To facilitate cleaning of bed 3 and collection of the liquid filtrate, grates 9 are raised above bed 3 approximately 6" and supported by support bars 10 running the length of bed 3. Support bars 10 have transverse openings 11 to allow liquid to flow to drain 6. Depending on the weight of the sludge and the composition of filter 8, additional, intermediate support, between filter 8 and grate 9 may be required. For example, ¼" mesh screen 12 may be provided as shown in FIG. 2. Alternately, a series of screens ranging from 1" to ⅛" openings could be used.

Referring to FIG. 3, grate 9 also extends from bed 3 up sides 4. Grate 9 is held in a vertical position by brackets 13 which also have the effect of providing a 4"–6" gap between grate 9 and the interior of vessel 2. Brackets 13 are located below the top of grate 9 and do not interfere with filter 8 which is lapped over the top of grate 9. Brackets 13 are intermittent to provide openings to allow liquid which is wicked up filter 8 and over the top of grate 9, to flow down sides 4 and into drain 6. The top of grate 9 has a 1½" diameter pipe 20 welded to it to avoid snagging filter 8.

Multiple filters may be employed as shown in FIG. 4. Filters 8a, 8b, 8c are placed between layers of sludge 19. Multiple filters are helpful when liquid-solid separation by capillary or wicking action is relatively efficient as compared to separation by gravity filtration. Each of filters 8a–8c are lapped over a top edge of side grate 9.

Figure 5:
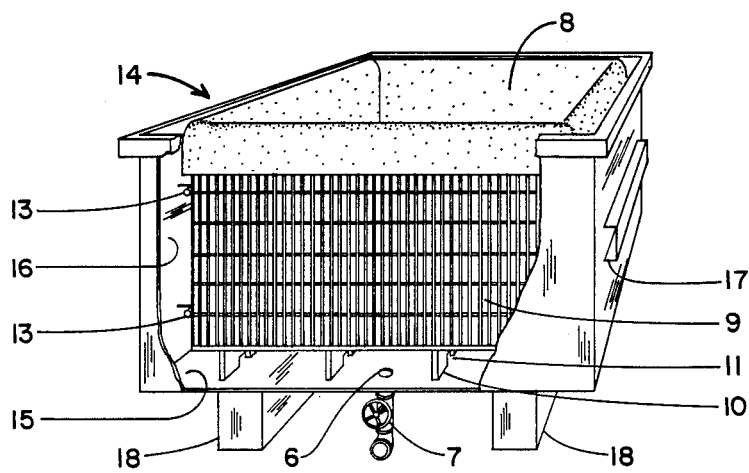
FIG. 5 is a perspective with cut away of an alternate embodiment of a liquid-solid separator incorporating a portable bin.

FIG. 5 shows an alternate embodiment of the invention employing a portable bin 14. Bin 14 has bed 15 and sides 16 corresponding to trailer separator 2. However, instead of a gate to facilitate dumping, bin 14 has handles 17 which can engage a dumping mechanism of a receptacle vehicle (not shown) such as those used for trash collection. Bin 14 also has skids 18 which maintain bed 15 raised off of the ground. Skid 18 may also incorporate rollers (not shown) for easier handling of bin 14.

The separation processes discussed above with regard to the trailer style separator 1, filtration and capillary action, apply as well to portable bin 14. For example, bin 14 has support bars 10, grates 9, screen 12 and filter 8. Liquid is collected in drain 6 in bed 15. In a preferred embodiment, filter 8 extends up all of sides 16 to draw liquid upward over the top of grate 9. The edge of filter 8 is positioned between grate 9 and side 16 to contain the liquid and direct it to drain 6.

Those with skill in the art will recognize that bin 14 need not be rectangular. For example, bins which are circular or hopper shaped may be used. The sides of the bin can be inclined rather than vertical.

In an alternate embodiment the concept of a portable dumpster is incorporated with the end gate feature of the trailer (not shown). For example, a portable dumpster without running gear, i.e. wheels, axles, etc., would have a side which swings open to facilitate dumping as shown in 4b, 4c and 5 of FIG. 1.

It is envisioned that in most applications, filter 8 will be disposable. Accordingly, when vessel 2 is either inverted or tilted to remove dried sludge 19, filter 8 will be dumped out also. The support medium beneath filter 8, such as grate 9, screen 12 and support bars 10 are to be firmly secured to vessel 2. In those instances where filter 8 is to be reused, it may be fastened to the interior of vessel 2.

There are, of course, many alternate embodiments and modifications which are intended to be included within the scope of the following claims.

What I claim is:

1. A portable liquid-solid separator for sludge, comprising:
   (a) an upright trailer having a bed and surrounding sides, said bed having a drain;
   (b) a first grate overlaying said bed;
   (c) a first means to support said first grate in a position to allow said liquid to flow through said grate to said drain;
   (d) a second grate extending upright from said bed;
   (e) a second means to support said second grate in a position to create a gap between said second grate and one of said sides of said trailer; and
   (f) a filter inducing capillary attraction between said filter and said liquid, said filter overlaying said first grate and said second grate, and said filter overlapping a top edge of said second grate and extending into said gap.

2. A separator according to claim 1 wherein said second grate and said filter overlay more than one side of said trailer.

3. A separator according to claim 1 wherein a side of said trailer is a gate, said gate having means to seal said gate against both (a) said bed and (b) said sides of said trailer adjacent to said gate.

4. A separator according to claim 1 wherein said trailer further comprises skids attached to the bottom of said bed.

5. A separator according to claim 4 wherein said trailer further comprises handles attached to said sides.

6. A separator according to claim 1 wherein said first means comprises a plurality of support bars positioned between said first grate and said bed, said bars having openings positioned to allow said liquid to flow through said grate.

7. A separator according to claim 1 wherein said second means is positioned below said top edge of said second grate.

8. A portable liquid-solid separator for sludge, comprising:
   (a) an upright trailer having a bed and surrounding sides, said bed having a drain;
   (b) a first grate extending from said sides and overlaying said bed;
   (c) a first means to support said first grate in a position above said bed to allow said liquid to flow through said grate and to said drain;
   (d) a second grate extending upright from said bed;
   (e) a second means to support said second grate in a position to create a gap between said second grate and one of said sides of said trailer to allow said liquid to flow downward toward said bed; and
   (f) a filter overlaying said first grate and said second grate, said filter extending into said gap.

* * * * *